United States Patent [19]

Douglass et al.

[11] Patent Number: 4,550,888
[45] Date of Patent: Nov. 5, 1985

[54] DUAL PRESSURE SOLID PROPELLANT CONTROL SYSTEM

[76] Inventors: Randle Douglass, 724 Glen Coe Ct., Sunnyvale, Calif. 94087; H. George Jacquin, 11220 Palos Verdes Ct., Cupertino, Calif. 95014; Paul M. Chewey, 1085 Golden Way, Los Altos, Calif. 94022; Paul A. Galvan, 1141 Corvallis Dr., San Jose, Calif. 95120; Richard S. Naragon, 1127 S. Genevieve La., San Jose, Calif. 95128

[21] Appl. No.: 392,830
[22] Filed: Jun. 28, 1982

Related U.S. Application Data

[63] Continuation of Ser. No. 840,941, Oct. 11, 1977, abandoned.

[51] Int. Cl.$^4$ ............................................... F41G 7/00
[52] U.S. Cl. ............................. 244/3.22; 244/169
[58] Field of Search ............... 244/3.15, 3.21, 3.22, 244/169, 159, 164, 171, 172; 60/229

[56] References Cited

U.S. PATENT DOCUMENTS

| | | | |
|---|---|---|---|
| 3,139,725 | 7/1964 | Webb | 60/229 |
| 3,243,313 | 3/1966 | Aves | 244/158 A |
| 3,478,965 | 11/1969 | Llewellyn | 60/229 |
| 3,736,749 | 6/1973 | Kretschmer et al. | 60/229 |

*Primary Examiner*—Charles T. Jordan
*Attorney, Agent, or Firm*—R. F. Beers; C. D. Curry; W. C. Daubenspeck

[57] ABSTRACT

A dual pressure solid propellant control system capable of operating at temperatures of approximately 3000° F. and at multiple pressures. A solid propellant gas generator is connected to a plurality of valve clusters by a manifold, the valves and manifold being of a high temperature material and each valve being independently operable. A pressure feedback loop maintains the system pressure at a commanded value by effectively increasing or decreasing the gas exit area by varying the pulse duration modulation of the valves.

1 Claim, 2 Drawing Figures

FIG_1

DUAL PRESSURE SOLID PROPELLANT CONTROL SYSTEM

This application is a continuation of application Ser. No. 840,941, filed Oct. 11, 1977, now abandoned.

BACKGROUND OF THE INVENTION

1. Field of the Invention

The present invention relates to solid propellant control systems, and more particularly to a dual pressure solid propellant control system.

2. Description of the Prior Art

For the deployment of packages from an aerospace vehicle during the boost phase of a mission profile it is desired to provide attitude and velocity control of the package platform in response to flight control commands for the proper deployment attitude of the platform and the necessary spacing between packages, respectively. A prior solid propellant control system has a comparatively low specific impulse thrust output at temperatures of approximately 2200° F. The materials of the components such as the valves and hot gas manifold are of high temperature metallic alloys such as Haynes 25, a cobalt alloy. The valves are operated as open centered valves so that one-half the valves are open and one-half the valves are closed at all times with each pair of opposing valves operating in conjunction with each other to provide a constant gas flow. This system is inefficient since the same hot gas flow rate provides both the velocity increment required for package spacing and the attitude control for platform orientation. Additionally, change in the platform center of gravity as packages are deployed results in decreased thrust, another inefficiency of the system.

SUMMARY OF THE INVENTION

Accordingly, the present invention provides a dual pressure solid propellant control system of a relatively high specific impulse whose thrust output can be modulated over a wide range of thrust levels. A solid propellant gas generator with a high burn rate exponent propellant provides a hot gas flow via a manifold to a plurality of valve clusters having at least one nozzle each. The valves and the manifold are made from high temperature materials capable of resisting temperatures of approximately 3000° F. The valves function in a proportional manner, and are independently commanded to provide an effective variable exit area for the hot gases. A pressure feedback loop compares the pressure of the gas generator with a commanded reference pressure to regulate the pulse-width modulation of the valves.

Therefore, it is an object of the present invention to provide a solid propellant velocity and attitude control system for an aerospace vehicle package deployment platform.

Another object of the present invention is to provide a solid propellant control system which operates over a range of thrust levels.

Still another object of the present invention is to provide a solid propellant control system which maintains effective thrust levels constant in the flight direction when the aerospace platform center of gravity changes.

Other objects, advantages and novel features of the present invention will be apparent from the following detailed description when read in conjunction with the claims and attached drawing.

DESCRIPTION OF THE PREFERRED EMBODIMENT

The function of a control system is to provide attitude and velocity control for an aerospace platform, such as a payload stage of a rocket, in response to flight control commands. There are in general two major operating modes: (1) coarse mode involving velocity increments for deployment spacing between a plurality of payload packages, and (2) vernier mode for nulling out the small remaining velocity errors and for precise attitude control and deployment.

Figure 1:
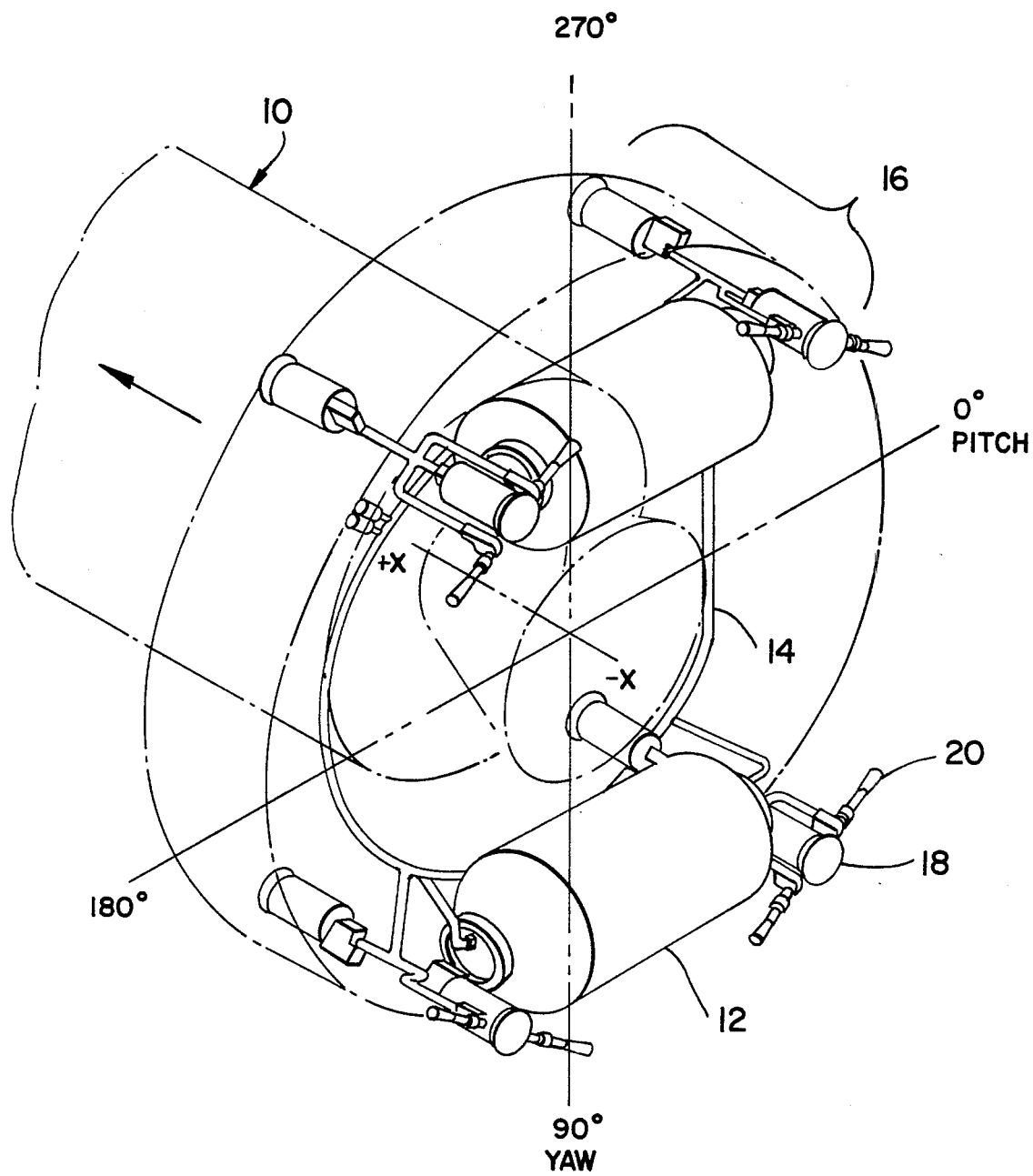
FIG. 1 is a perspective view of a dual pressure solid propellant control system configuration according to the present invention.
Figure 2:
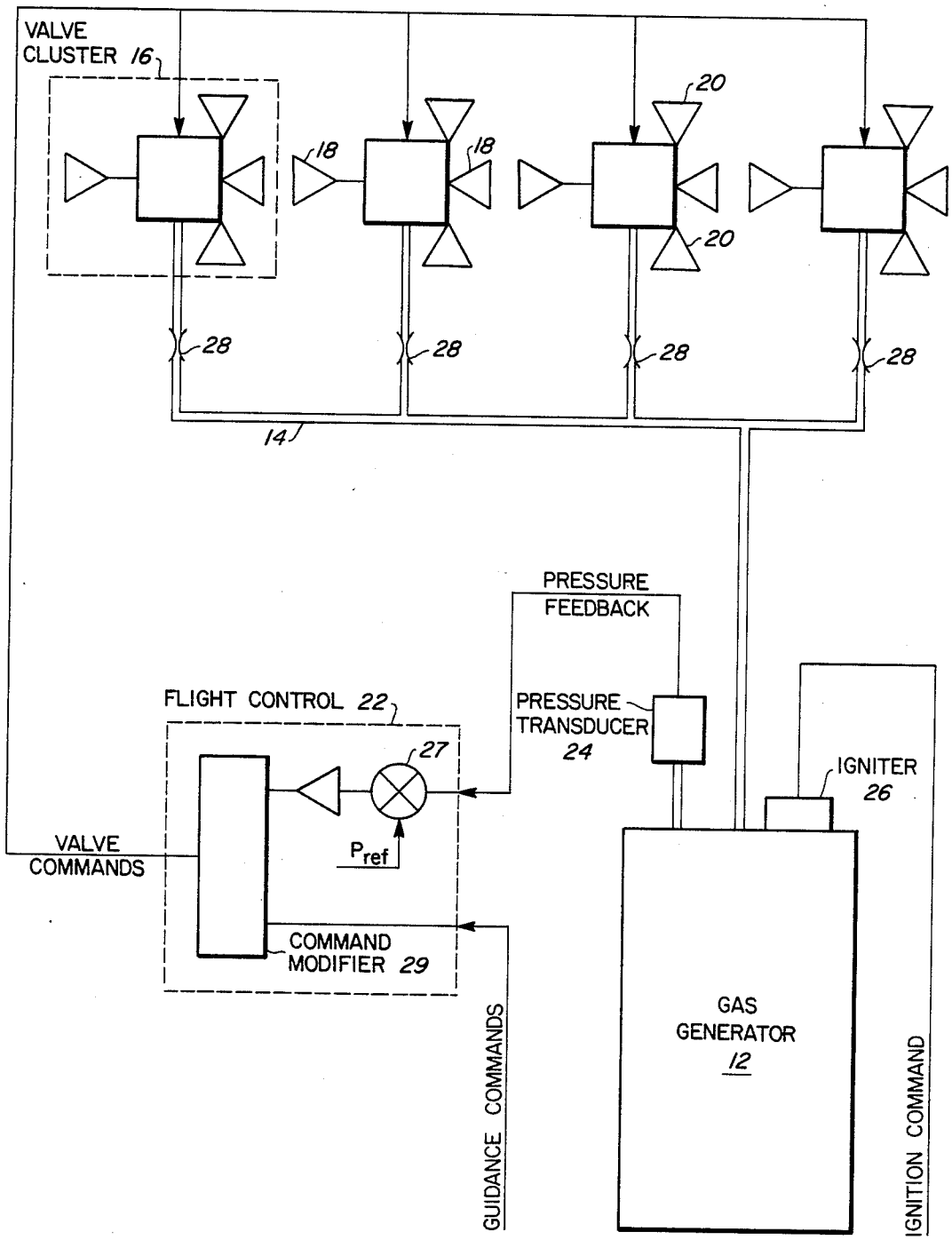
FIG. 2 is a functional schematic view of the dual pressure solid-propellant control system.

Referring to FIGS. 1 and 2 the control system is mounted on an aerospace platform 10 and has one or more gas generators 12 connected in parallel via a hot gas manifold 14 to a plurality of valve clusters 16. Each valve cluster 16 has at least one nozzle, such as a high thrust nozzle 18 and/or a low thrust nozzle 20. Each nozzle 18, 20 can be independently opened or closed by a command signal from a flight control package 22. The valve clusters 16 are located symmetrically around the platform 10 to simplify the control logic necessary for computing nozzle commands.

The command signal is a flight control command signal as modified by a pressure feedback system to compensate for the effects of valve tolerances, propellant burn rate and other variables in maintaining a constant pressure. The pressure feedback system has a pressure transducer 24 mounted on the gas generator 12, which is initiated upon command by an igniter 26, to produce a signal indicative of the system hot gas pressure. The transducer signal is compared at 27 in the flight control package 22 with a reference pressure, $P_{ref}$, determined by the mode of operation of the control system, and the error output modifies the guidance command signal in block 29 to produce the command signal to the nozzles 18, 20. Additional pressure control is provided by a venturi 28 at the inlet of each valve cluster 16 which establishes the minimum system hot gas pressure. The pressure limits of the control system are determined by weight—higher pressure tends to increase weight—and by propellant ballistic characteristics—too low a pressure affects valve dynamics and combustion stability during the vernier mode.

The dual pressure solid propellant control system achieves increased performance due to a higher gas temperature of approximately 3000° F. due to the use of high specific impulse, low burn rate and high pressure exponent propellants such as a free standing class 7 HMX (cyclotetramethylenetetranitramine)-oxidized composite propellant with a binder system based on hydroxy terminated polybutadiene (HTPB) polymer and cured with isophorone diisocyanate (IPDI) curative including a small amount of carbon black as an opacifier which is able to burn stably over a wide pressure range; and due to hot gas valves which function in a proportional manner such as on/off valves operated in a pulse duration mode (PDM). The result in combination with the pressure feedback loop produces a control system able to obtain any desired thrust output within a designed range.

In the vernier mode all thrust nozzles 18, 20 are driven so that each appropriate pair of nozzles operate in the open center fashion, i.e., at any given time one-half the high thrust nozzles 18 and one-half the low thrust nozzles 20 are flowing gas, presenting the highest programmed flow area (combined nozzle throat area) to the gas generator 12. The gas generator thus operates at the minimum expected pressure and thrust which is more efficient for attitude control. In this thrust condition the appropriate nozzles 18, 20 can be operated to terminate all accelerations, to null out any small velocity errors or to continue thrusting at a low level.

The coarse mode is used to accelerate the platform 10 in a particular direction, thus the gas flow output will be from the high thrust nozzles 18. In this mode one-half the high thrust nozzles 18 and all the low thrust nozzles 20 are closed. One-half the high thrust nozzles 18 operating in the thrusting direction are then each commanded to a percentage of the maximum area as determined by the system design. For example, the reduction of the effective gas generator nozzle throat area to 70% increases the gas generator pressure and consequently the gas output. The gas generator pressure and flow will then stabilize at a new higher level depending upon the propellant ballistic characteristics, reducing flight time during spacing maneuvers.

Another advantage of the dual pressure solid propellant control system resulting from independent control of each nozzle 18, 20 is the ability to compensate for center-of-gravity (c.g.) offsets without decreasing the total thrust in the flight direction during acceleration. This is accomplished by increasing the thrust of the nozzles nearest the c.g. offset location and decreasing the thrust of the nozzles farthest from the c.g. offset location by simultaneous and equal increases and reductions of effective nozzle areas so that the total throat area sensed by the gas generator is constant, resulting in constant system pressure and all thrust in the acceleration direction. Prior art constant area control systems require some thrust against the acceleration direction to compensate for c.g. offsets, resulting in reduced total thrust in the acceleration direction.

For example, if the c.g. moves radially toward one nozzle 18 in coarse mode, that nozzle would be PDM'd to 70+Y% and the diametrically opposite nozzle would be PDM'd to 70−Y% until stability is obtained, the other nozzles 18 remaining at 70%. Before the c.g. offset the total throat area was nx70%, and after c.g. offset it is still (n−2)x70%+(70+Y)%+(70−Y)%=nx70%.

To accommodate the hot gas flow at 3000° F. the valve clusters 16 and hot gas manifolds 14 are made from high temperature materials such as refractory alloys of columbium, tantalum and molybdenum. The high oxidation rates of columbium and tantalum when exposed to the oxidizing potential of the hot gases are inhibited by a then (3 mil) silicide coating. Molybdenum and tungsten alloys, used where greater strength is required, are left uncoated as their oxidation rates are acceptable.

Insulation around the hot components protects the platform 10 and associated electronics from the thermal energy emitted.

Each high pressure nozzle 18 is controlled by a two-stage normally closed pneumatic valve having a pilot valve and a piston actuated main stage. The pilot valve powers the main stage piston upon command. Each low thrust nozzle 20 is controlled by a single stage valve similar to the high thrust pilot valve, but modified for a slightly higher flow.

Thus, by using more efficient propellants at a higher temperature with individually controlled nozzles to provide a variable throat area, together with a pressure feedback system to compensate for component tolerances, the present invention provides a dual pressure solid propellant control system which saves energy by switching from a high pressure mode to a low pressure mode depending on the particular impulse requirements. The saving in energy results in an increased range of several hundred miles over prior art solid propellant control systems. Although only two pressure modes have been described, the pressure is variable within the pressure range, 160–550 psi for the described embodiment, depending upon $P_{ref}$ and the commanded rate, which results in a mass flow output ratio, or thrust ratio, of approximately 1.5 or higher, i.e., system output, either mass flow or thrust, at high pressure divided by system output at low pressure.

We claim:

1. A method for controlling the attitude and velocity of an aerospace platform having a post boost control system of the type including (1) a solid propellant gas generator for providing a hot gas output, the burn rate of said propellant being related directly to the pressure of said gas output so that the rate of said gas output is directly related to the gas pressure of said gas output, (2) valve clusters disposed symmetrically around the platform, each said valve cluster having a first high thrust nozzle oriented to produce thrust in a first direction relative to the platform and a second high thrust nozzle oriented to produce thrust in a direction 180 degrees from the first direction, each valve cluster having a first low thrust nozzle oriented to produce thrust in a direction 90 degrees from the direction of the thrust of said high thrust nozzles and a second low thrust nozzle oriented to produce thrust in a direction 180 degrees from the direction of thrust of said first low thrust nozzle, each said valve cluster having means for individually opening or closing the thrust nozzles associated therewith upon command, and (3) means for coupling the hot gas from said generator to an inlet part of each said valve cluster, said method for controlling the attitude and velocity of the aerospace platform providing a first pressure at the gas generator during velocity adjustments and a second, lower pressure during attitude adjustments to conserve propellant during attitude adjustments, during velocity adjustment said method comprising:
   (a) closing all of said low thrust nozzles;
   (b) closing all of said high thrust nozzles oriented opposite to the desired direction of thrust; and
   (c) operating the high thrust nozzles oriented in the desired direction of thrust in a pulse duration mode, the ratio of time open to the time closed being selected to provide an effective nozzle throat area to provide a first selected pressure at said gas generator, whereby a first burn rate of said propellant is produced; and during said attitude adjustment, said method comprising:
   (a) operating said high thrust nozzles in a pulse duration mode so that one half of the high thrust nozzles are open at any one time and no net acceleration is provided parallel to the velocity vector of said platform; and
   (b) operating said low thrust nozzles in a pulse duration mode so that one half of the low thrust nozzles are open at any one time and to provide appropriate accelerations for the desired attitude adjustment, the effective area of the nozzle throat being greater than in said velocity adjustment, whereby the gas pressure in said gas generator is less than said first gas pressure to provide a propellant burn rate less than said first burn rate.

* * * * *